United States Patent [19]

Penrod

[11] Patent Number: 5,317,488
[45] Date of Patent: May 31, 1994

[54] INSULATED INTEGRAL ELECTROLUMINESCENT LIGHTING SYSTEM

[76] Inventor: Darlene Penrod, 1420 W. Cuyler, Chicago, Ill. 60613

[21] Appl. No.: 977,532

[22] Filed: Nov. 17, 1992

[51] Int. Cl.⁵ .............................................. F21V 9/16
[52] U.S. Cl. ...................... 362/84; 362/267; 313/512
[58] Field of Search .................. 313/506, 511, 512; 315/169.3, 68, 71, 209 R; 40/544; 362/84, 267

[56] References Cited

U.S. PATENT DOCUMENTS

| | | | |
|---|---|---|---|
| 2,945,976 | 7/1960 | Fridrich et al. | 313/502 |
| 3,177,391 | 4/1965 | Devol et al. | 313/512 |
| 3,680,237 | 8/1972 | Finnerty, Sr. | 40/544 |
| 3,886,581 | 5/1973 | Katsumura et al. | 313/512 |
| 4,195,431 | 4/1980 | Neufeld | 40/544 |
| 4,494,326 | 1/1985 | Kanamori | 362/84 |
| 4,618,802 | 10/1986 | Schrank | 313/512 |
| 4,637,148 | 1/1987 | Barlow | 40/544 |
| 5,034,847 | 7/1991 | Brain | 362/84 |

Primary Examiner—Ira S. Lazarus
Assistant Examiner—Alan B. Cariaso
Attorney, Agent, or Firm—Paul Y. Feng

[57] ABSTRACT

An integral, light weight, recyclable, self-contained battery operated and insulated lighting system using an electroluminescent light source is described. This is achieved by re-locating the terminals of an electroluminescent light source away from the outer edges, securing the power supply unit onto the body of the light source, and encapsulating both the electroluminating light source and the converter into one unit. On-off control, if desired, is incorporated in the same unit using a commercial membrane switch. Only the low voltage D.C. end of the converter is therefore exposed for attachment to a regular battery which may also be encapsulated with the converter and light source into one single unit, increasing further the water and electrical resistivity and hence the safety of the system.

The system is recyclable. A damaged or spent unit can be removed, replaced, followed by the re-encapsulation of the entire system.

9 Claims, 1 Drawing Sheet

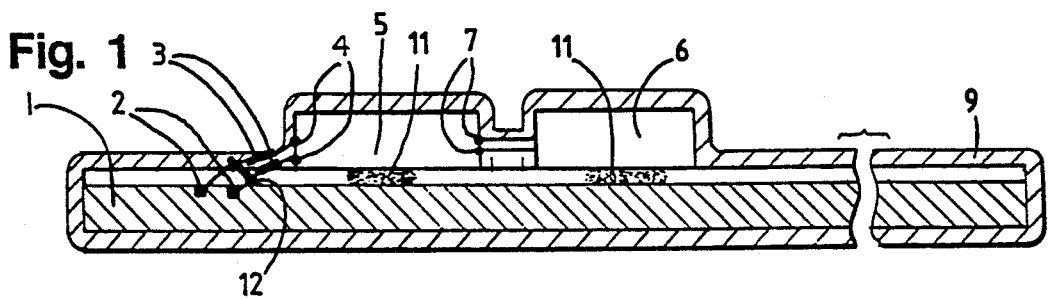
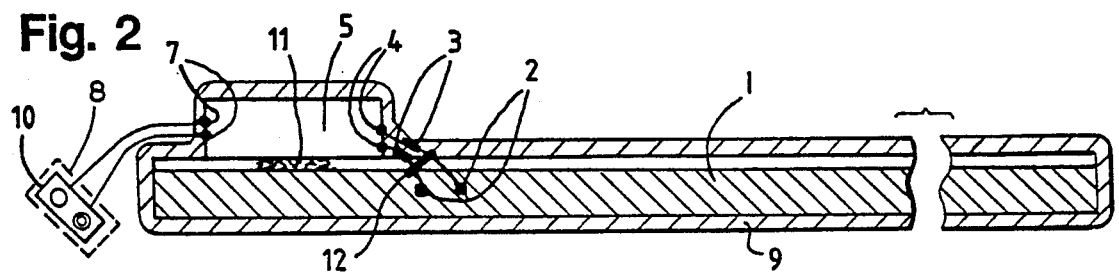
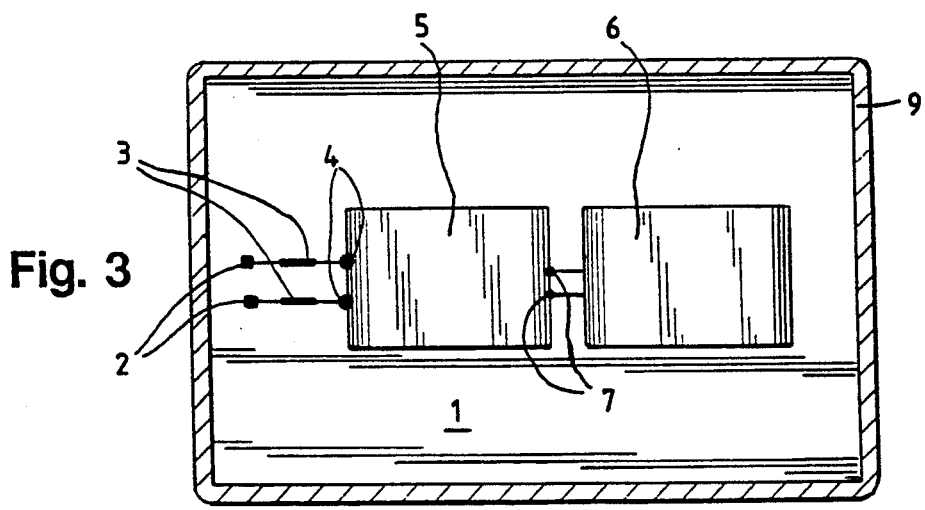
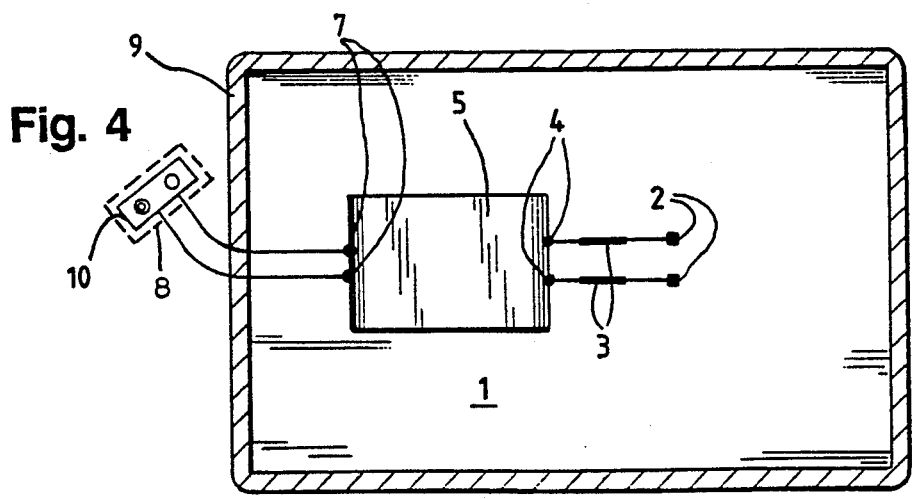

INSULATED INTEGRAL ELECTROLUMINESCENT LIGHTING SYSTEM

FIELD OF THE INVENTION

This invention relates to an electroluminescent lighting unit which is insulated against moisture and electrical leakage and in the form of a self-contained integral unit. It may therefore be used either as an independent light source or as a component unit in a larger system. In contrast to other light sources requiring fluorescent or incandescent bulbs, the products based on the instant invention is not only light weight, but also shatterproof.

BACKGROUND OF THE INVENTION

Electroluminescence generates visible light in a manner distinct from light emission based on other physical principles such as blackbody radiation. It has the unique ability of generating optical radiation over a broad spectrum and from a source of either large or area without resorting to high temperature.

Electroluminescence was discovered shortly before the Second World War by Destriau in a system which consisted of a phosphor (a mixture of zinc sulfide and zinc oxide) suspended in a dielectric medium (castor oil) between two electrodes. For a number of reasons, it has been actively investigated by many scientists and engineers since 1946. As a result of such efforts, the fundamental principles of electroluminescence are quite well understood, i.e., it is the result of collision excitation of certain phosphors by an alternating electric field. Accordingly, subsequent effort have mainly been expended on the preparation of making phosphors with selected characteristics or on improvements in the manufacturing methods.

Electroluminescent light sources are sometimes identified in the literature as electroluminescent lamps. In the discussions that follows, the original terminology in the literature will be used even though an electroluminescent light source is more analogous to a light bulb than a lamp.

Commercially available electroluminescent light sources are often inadequately insulated, i.e., their electrical conducting components may not be properly protected against moisture or electrical leakage. In view of the unique characteristics of electroluminescent light, however, it is not difficult to visualize the advantage of portable self-contained electroluminescent lighting systems, e.g., their use as a night light, a low intensity illuminator, an ornament for a garment, or an enjoyable toy for children of all ages.

In at least one special application involving the possibility of saving a human life, a portable electroluminescent lighting system has been described in Brain U.S. Pat. No. 5,034,847. In Brain, a series of electroluminescent lights are connected to each other with electrical leads and sealed in a protective envelope which may be made from silicone, fluorosilicone, or a fluorocarbon elastomer. This sealed unit is then connected through a cable to a water-tight power supply constructed with a series of connectors, O-rings, etc. By using such a design, additional components such as a water-sensing switch and a radio-beacon circuit may also be incorporated, The light source operates automatically when exposed to moisture, and aids the efforts of a search party in a rescue operation.

The electroluminescent lighting system in Brain appears to be a valuable addition to navigation safety, but would be expensive in view of the manufacturing steps required for the water tight power supply unit. Moreover, the existence of three separate components (power supply, cable, light source) would make it inconvenient or even impractical to be used as a portable light, a novelty decoration, or in other consumer applications.

Methods for insulating an electroluminescent light source without insulating the power supply and the electrical terminals also have been disclosed in the literature. In Calamia U.S. Pat. No. 4,999,936 is described a light source which comprises a laminated structure of a flexible non-conductive material, a conducting film, a phosphor coating which may be tinted to produce a variety of light, a second transparent conductive film, and an open ended conductive trace. The laminated structure, in turn, is protected by an laminating film and inserted into a clear protective cover. Electrical connection is accomplished by cutting a slit into the cover and said encapsulating film and attaching a wiring clip onto the open ended conducting trace. The electrical connection area and the conducting trace exposed through the slit therefore remain un-insulated.

A somewhat similar approach is described in Devol and Kirk U.S. Pat. No. 3,177,391. In Devol and Kirk, a conventional flexible electroluminescent cell or lamp is provided with a stiffening means comprising a layer of open-weave cloth material partially embedded in the outer side of the thermoplastic cover layer of the cell or lamp, and an outer stiffening overlay comprising preferably of a different thermoplastic sheet material having a softening temperature appreciably below that of the first thermoplastic layer. In this matter, the plastic stiffening sheet is laminated to the cell at a temperature appreciably below the softening temperature of the outer-layer of the cell and thereby avoiding any damage of the cell by the heat attending such laminating operation. Ribbon-type conductors which project laterally from edge of the outer envelope of stiffening overlay are, however, needed so that the cell can be connected to a power supply. In other words, the electrical connections remain un-insulated as in the light source in Calamia.

An alternative approach for insulating an electroluminescent light source is described In Schrank U.S. Pat. No. 4,618,802. It details a method to hermetically seal an electroluminescent or other thin film device in which the device includes a thin film matrix supported on a glass substrate. The glass substrate is mounted in a frame, with a frit seal provided between the glass substrate and the frame, and a cover secured to the frame by a weld or solder joint. To maintain structural integrity of the system, materials with substantially similar coefficients of thermal expansion are used to form surfaces bounding each seal so as to maintain structural integrity of the system. This method would be applicable, however, only to rigid electroluminescent light sources. It can not be used for the more common flexible, plastic based, electroluminescent light sources such as the one described in Fridrich et al U.S. Pat. No. 2,945,976 and which have been commercially available from many sources at least since the early 1980's.

For many potential consumer applications, however, insulating only the electroluminescent light source can only be considered a partial solution. An electroluminescent lamp requires electric power in the form of an alternating current, be it directly from a generator or from a battery through a D.C. to A.C. inverter. Typically, the A.C. voltage is on the order of 100 volts or higher. Accordingly, if any un-insulated conducting area is exposed to moisture or touched, lost of power through leakage or unpleasant shock may occur. For stationary subjects such as exit signs in buildings, additional protection may be afforded by positioning the light source away from moisture or possibility of contact. Such an approach is, however, of little value if the electroluminescent lamps are to be used in applications such as a low intensity portable light, an ornament, or a toy for children.

SUMMARY OF THE INVENTION

The objective of the present invention is to provide an integral, self-contained, battery operated and insulated lighting system using an electroluminescent light source. The lighting system would be light in weight, easy to manufacture, safe against ordinary hazards, conveniently portable, and preferably recyclable. This is achieved by relocating the terminals of the electroluminescent light source away from the outer edges, securing the D.C. to A.C. inverter circuitry directly onto the body of the light source, and encapsulating both the electroluminating light source and the inverter into one unit. On-off control, if desired, is incorporated in the same unit using a commercial membrane switch. Only the low voltage D.C. end of the inverter is therefore exposed for attachment to a regular battery. Moreover, and as an additional option, the entire system including the battery can be completely encapsulated into one single unit, increasing further the water and electrical resistivity of the system and its safety to the user.

Mechanical stability of the system is achieved through the mutual reinforcement of the various units and the encapsulating agent. Ease in manufacturing is achieved by the dual-purpose use of the encapsulating agent also as the adhering agent for the inverter (and if applicable also the battery) to the body of the electroluminescent light source. Recyclability is achieved by using a commercial D.C. to A.C. inverter or by pre-encapsulating the inverter circuitry into a separate unit using a material inert to the final encapsulating agent for the entire lighting system. In this manner, a damaged or spent unit can easily be removed, replaced, as would be the re-encapsulation of the entire system.

BRIEF DESCRIPTION OF THE DRAWINGS

FIG. 1 is the side view of a completely encapsulated lighting system which includes an electroluminescent light source, electrical terminals and connectors, an optional membrane switch, a D.C. to A.C. inverter and a battery.

The corresponding top view is shown in FIG. 3.

FIG. 2 is the side view of an encapsulated lighting system powered by a detachable external battery through the use of a conventional battery terminal.

The corresponding top view is shown in FIG. 4.

DETAILED DESCRIPTION OF THE PREFERRED EMBODIMENTS

Referring to the figures, the preferred embodiments of the instant invention are as follows. A commercial electroluminescent light source 1, such as an un-encapsulated PERMA-LITE (TM) electroluminescent lamp sheet made by Quantex, Rockville, Md. or an encapsulated Electroluminescent lamp sheet from Loctite Luminescent Systems, Inc., Lebanon, N.H., is modified so that its terminals 3 are located within the periphery of the source instead of extruding from the edges. The relocated terminals 3 are then connected by means of a pin connection system such as the ones supplied by AMP, Inc. Harrisburg, Pa. to a D.C. to A.C. inverter circuit 4 comparable to the designs in readily available commercial units such as the SMART FORCE (TM) inverter from ERG, Inc., Endicott, N.Y. or Inverter Model No. 4105 from TECH LITE, Lancaster, Tex. An optional control switch 2 such as a membrane switch or the like, can be incorporated between the A.C. output end of the inverter circuit 4 and the terminals 3 of the electroluminescent lamp sheet 1.

A battery 5 may be removably attached to the D.C. input of the inverter, or encapsulated with the other structural components to form a completely sealed system. If a completely sealed system is the designated product, a commercial battery is directly attached to the D.C. input terminals of the inverter and the entire system encapsulated with a resilient and water-resistant insulating material. If an assembly with a removable battery unit is the designated product, the D.C. terminals are connected to a commercial battery clip.

Manufacture is facilitated if the relative positions of the components are stabilized during the assembling process by small amounts of a silicone based adhesive. In addition, in the case of units using detachable batteries, a convenient procedure to preserve the electrical conductivity of the battery clips is to cover the latter with removable plugs during encapsulation.

Encapsulation of the system, with or without battery 5 may be achieved by a number of methods, e.g., solvent removal by dipping and evaporation, or solution polymerization. The coating material as well as any solvent must be selected carefully so as not to affect the integrity of the light source or the other components of the system. Furthermore, the final coating must have proper flexibility and resiliency if a membrane switch is incorporated in the system because control of the membrane switch will be achieved by application of pressure through the encapsulating envelope.

At the present, the most satisfactory products of manufacture based either on an encapsulated or on an un-encapsulated electroluminescent light source, and either with or without the inclusion of a membrane switch, are assemblies using a nominal D.C. input voltage of 9 volts which produces a nominal A.C. output of 80 volts. The best encapsulating material is a solution of thermoplastic polymers of the rubber family in a solvent mixture of volatile organic materials consisting essentially of 1,1,1 trichloroethane, n-heptane, toluene, and petroleum hydrocarbons in the naphtha family. To date, satisfactory products have been obtained if the solvent molecules are removed by evaporation at temperatures ranging between 15 and 30 degrees Celsius.

The preceding description is based on prototypes representing the present best mode of making said portable electroluminescent lighting systems. However, it will be appreciated that those skilled in the art, upon consideration of this disclosure, may make modifications and improvements within the scope of this invention.

I claim:

1. An improved electroluminescent lighting system using a conventional electroluminescent light source having a luminescent face, a non-luminescent face, and external edges, the improvement comprising:

(a) at least two electric termination points positioned on the non-luminescent face of said light source and at a distance from the external edges;
(b) an energizing module attached to said termination points by a connecting means and positioned by an adhering means on the non-luminescent face of said light source at a distance from the external edges; and
(c) a resilient and water resistant cover encapsulating the luminescent face, the non-luminescent face, and the external edges of said light source, said termination points, said energizing module, and said connecting means.

2. An illuminating assembly, as recited in claim 1, wherein the energizing module consists of a D.C. to A.C. inverter having D.C. input terminals and A.C. output terminals.

3. An illuminating assembly, as recited in claim 1, wherein the energizing module comprises a D.C. to A.C. inverter having D.C. input terminals and A.C. output terminals and a D.C. battery wherein said D.C. battery is securely attached to the D.C. input terminals of said D.C. to A.C. inverter.

4. An illuminating assembly, as recited in claim 1, wherein the connecting means comprises an electrical conducting material.

5. An illuminating assembly, as recited in claim 1, wherein the connecting means consists of a membrane switch and an electrical connecting material.

6. An illuminating assembly, as recited in claim 1, wherein the adhering means consists essentially of an organic based polymer.

7. An illuminating assembly, as recited in claim 1, wherein the adhering means consists essentially of a silicone based polymer, 8. An illuminating assembly, as recited in claim 1, wherein the resilient and water resistant insulating cover consists essentially of an organic polymer.

9. An illuminating assembly, as recited in claim 1, wherein the resilient and water resistant insulating cover consists essentially of a silicone based polymer.

* * * * *